US007237684B2

(12) United States Patent
Kanachowski

(10) Patent No.: US 7,237,684 B2
(45) Date of Patent: Jul. 3, 2007

(54) COLUMN STABILISER FOR STACKED CANS

(75) Inventor: Richard Marian Kanachowski, Stockport (GB)

(73) Assignee: Imperial Chemical Industries PLC, London (GB)

( * ) Notice: Subject to any disclaimer, the term of this patent is extended or adjusted under 35 U.S.C. 154(b) by 260 days.

(21) Appl. No.: 10/945,449

(22) Filed: Sep. 20, 2004

(65) Prior Publication Data

US 2005/0138887 A1    Jun. 30, 2005

(51) Int. Cl.
*A47F 7/00* (2006.01)
(52) U.S. Cl. .................................... 211/59.4
(58) Field of Classification Search ........... 211/59.4, 211/49.1, 74, 85.18, 85.23, 73, 126.7, 126.11, 211/126.12, 188, 194
See application file for complete search history.

Primary Examiner—Sarah Purol

(57) ABSTRACT

A column stabilising grid (1) is described for use in constructing stable columns of stacked objects, such as containers of paint. The grid (1) has a perimeter wall (2) bounding a number of locating cells (3) defined by walls (6) and (7) extending from a floor (4). Primary locating walls (6) are dimensioned to receive the base of a larger object and to resist lateral movement thereof. Secondary locating walls (7), each encompassed by a primary locating wall (6), are dimensioned to receive the base of a second, smaller object and to resist lateral movement thereof. The secondary locating walls (7) are eccentrically located within the primary locating walls (6). Stop means (10) and (11) depend from the underside of the grid (1). In use, a column is constructed by placing a grid (1) between adjacent layers of objects in a stack. The locating means of a first grid receive the bases of containers in one layer whilst the stop means on the underside of a second grid (1) abut against the tops of the containers in the layer. In this way, a stable compound column having a number of individual stacked objects can be constructed.

34 Claims, 5 Drawing Sheets

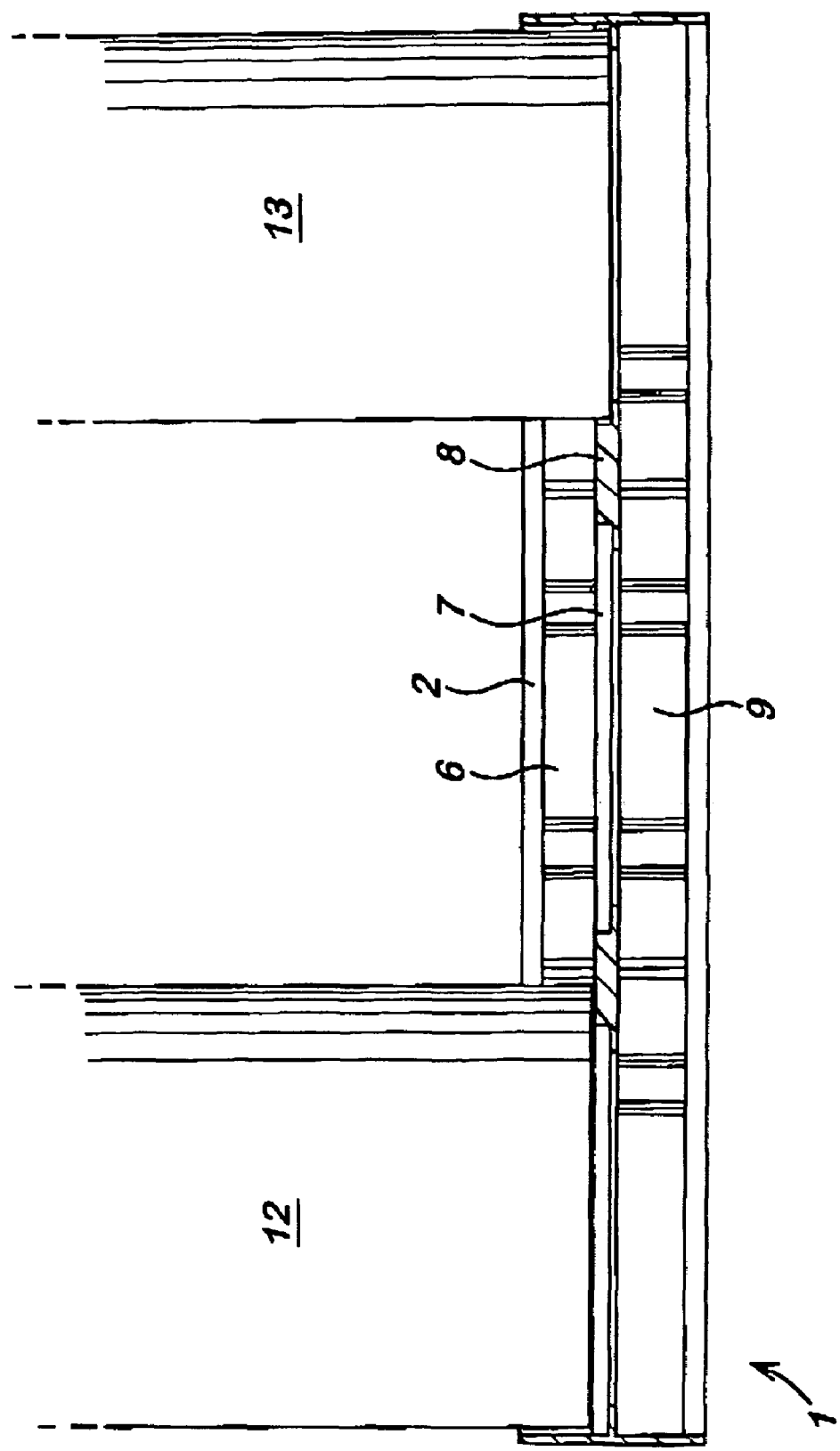

COLUMN STABILISER FOR STACKED CANS

This invention relates to a column stabiliser and its use in making stable columns of stacked objects of alternative sizes such as cans.

The problem with stacking cans vertically is that once the resulting column is more than two or three cans high, the column becomes unstable and prone to collapse. The slightest lateral force, for example someone accidentally bumping into or brushing past the column, will cause it to topple over with the attendant risk of injury to people nearby and spillage of the contents of the cans if the cans have press fit lids. Such problems are particularly troublesome where large cans having press-fit lids containing, for instance 2.5 or 5 liters of dense liquids, such as paint, are stacked on the floor in a shop. Even attempting to remove a can from a stable column can result in the column becoming dangerously unstable or collapsing altogether.

Past attempts to overcome this problem involved arranging cans not in single columns but in a plurality of columns so that cans in adjacent columns contact each other or are contiguous. In this way the columns support each other and the resulting compound column of stacked cans is more stable. However, these compound columns can only be built up to a height of three or four cans before they too become unstable. Adding a rigid interlayer between the layers of cans, such as a platform of rigid card or thin plywood makes a more stable base for the cans further up the column but this still produces a column of inadequate stability beyond about four layers.

Careful analysis of the problem has led the Applicant to conclude that the interlayer of the prior art reduces the problem of column instability, in compound columns up to three or four cans high, by providing some resistance to lateral movement. This resistance is a consequence of the frictional force between the cans and the surface of the interlayer material combined with the weight of all the cans in the layer and the support of cans in contact one with another. However, in order to stack cans in compound columns of more than three or four layers high, it has been found that relying on interlayers is insufficient.

Ideally, it is desirable to be able to stack cans of alternative sizes up to eight or even twelve high, depending on their size, thus saving floor-space and enabling retail consumers to select for themselves their choice of paint from a stable stack of cans.

It is an object of this invention to provide a column stabiliser enabling stable compound columns of substantially cylindrical cans of alternative sizes to be built of more layers than hitherto and without the need for the cans to be contiguous.

Accordingly there is provided a column stabilising grid for stabilising a plurality of stacks of objects, the grid having obverse and reverse faces, the obverse face having a plurality of first locating means each dimensioned to locate in use the base of the first object and to resist lateral movement thereof, and a plurality of second locating means each dimensioned to locate in use the base of a second, smaller alternative object and to resist lateral movement thereof, wherein each second locating means is encompassed by a first locating means, and the reverse face having a plurality of stop means positioned to abut in use the top of an object to resist lateral movement thereof, and wherein at least some of the second locating means are located eccentrically within the respective first locating means.

Use of the grid enables a stable compound column comprising a number of stacks of objects, optionally of alternative sizes to be constructed to a greater height than could be achieved previously.

More preferably, at least some of the second locating means are located eccentrically towards the periphery of the grid.

Conveniently the first and second locating means comprise walls extending from the obverse face.

Each first locating means may comprise a substantially circular wall, and may consist of a series of discontinuous wall segments.

Similarly, each second locating means may comprise a substantially circular wall, and may consist of a series of discontinuous wall segments.

Preferably, the first locating means are contiguous, and a perimeter wall may bound the first locating means.

Optionally, the column stabilising grid may further comprise smaller and smaller third, fourth and so on locating means for smaller and smaller objects wherein each of the smaller locating means is encompassed by the larger locating means.

In a preferred embodiment, the grid comprises seven first locating means arranged in hexagonal form with one central locating means and six surrounding locating means.

The grid may further comprise one or more support elements extending between a second locating means and the first locating means which encompasses it and/or another of the second locating means.

Conveniently, in use a first object located in a first locating means rests on the second locating means and the support elements, and a second object located in a second locating means rests on the obverse face of the grid.

Preferably, the stop means on the reverse face are aligned with the first locating means on the obverse face, and at least one further stop means on the reverse face which is aligned with at least one second locating means on the obverse face.

Conveniently, the stop means comprise walls depending from the reverse face.

The invention also provides a column comprising a plurality of stacks of objects, wherein a column stabilising grid as described is located between adjacent layers of objects in the stacks.

The invention will now be described in detail with reference to the accompanying drawings in which:

FIG. 5 is a cross section along the line AA of the column stabiliser of FIG. 1.

Figure 1:
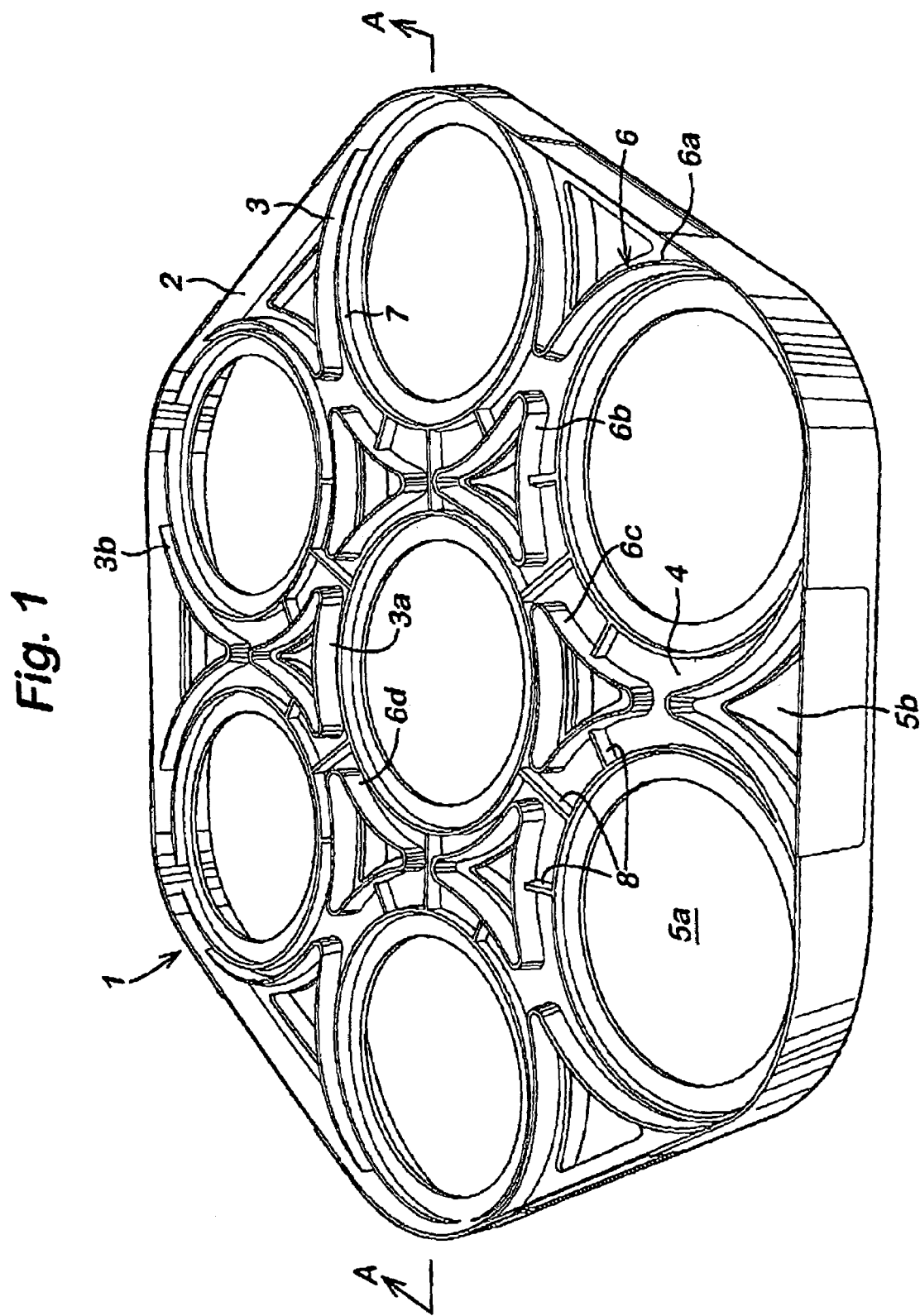
FIG. 1 is a perspective view of the obverse face of a column stabiliser in accordance with a first embodiment of the invention.

FIG. 1 is a perspective view from above of a column stabilising grid 1 in accordance with a first embodiment of the invention. The grid 1 has a substantially hexagonal perimeter wall 2 within which are located seven contiguous locating cells 3. The cells 3 are positioned in a hexagonal packing arrangement with a central cell 3a surrounded by six outer cells 3b.

The locating cells may be arranged in many other ways and there may be fewer or greater than seven. Examples of suitable arrangements include three cells arranged as a triangle or four arranged as a square when viewed in plan.

Although the grid 1 could be formed with a continuous floor within the perimeter wall 2, in this embodiment the floor 4 is provided with a number of circular and substantially triangular cutouts 5a, 5b to save weight and materials.

Each locating cell 3 is defined by a primary locating means 6 which in this case is a substantially circular upstanding wall. In this embodiment, the primary locating wall 6 is discontinuous to save weight and materials and assist in manufacture. The outer cells 3b each have a primary locating means 6 made up of a major arcuate segment 6a, and two minor arcuate segments 6b, 6c as shown. The major arcuate segment 6a merges into the perimeter wall 2. The central cell 3a is defined by six minor arcuate wall segments 6d.

Within each cell 3, a secondary locating means 7 is provided. For the central cell 3a this is a continuous circular wall concentric with the primary locating means 6. For the outer cells 3b, in the embodiment shown in FIG. 1, this takes the form of a continuous circular wall eccentrically positioned within a respective primary locating means 6, such that it merges into the primary locating wall segment 6a and the perimeter wall 2.

Figure 3:
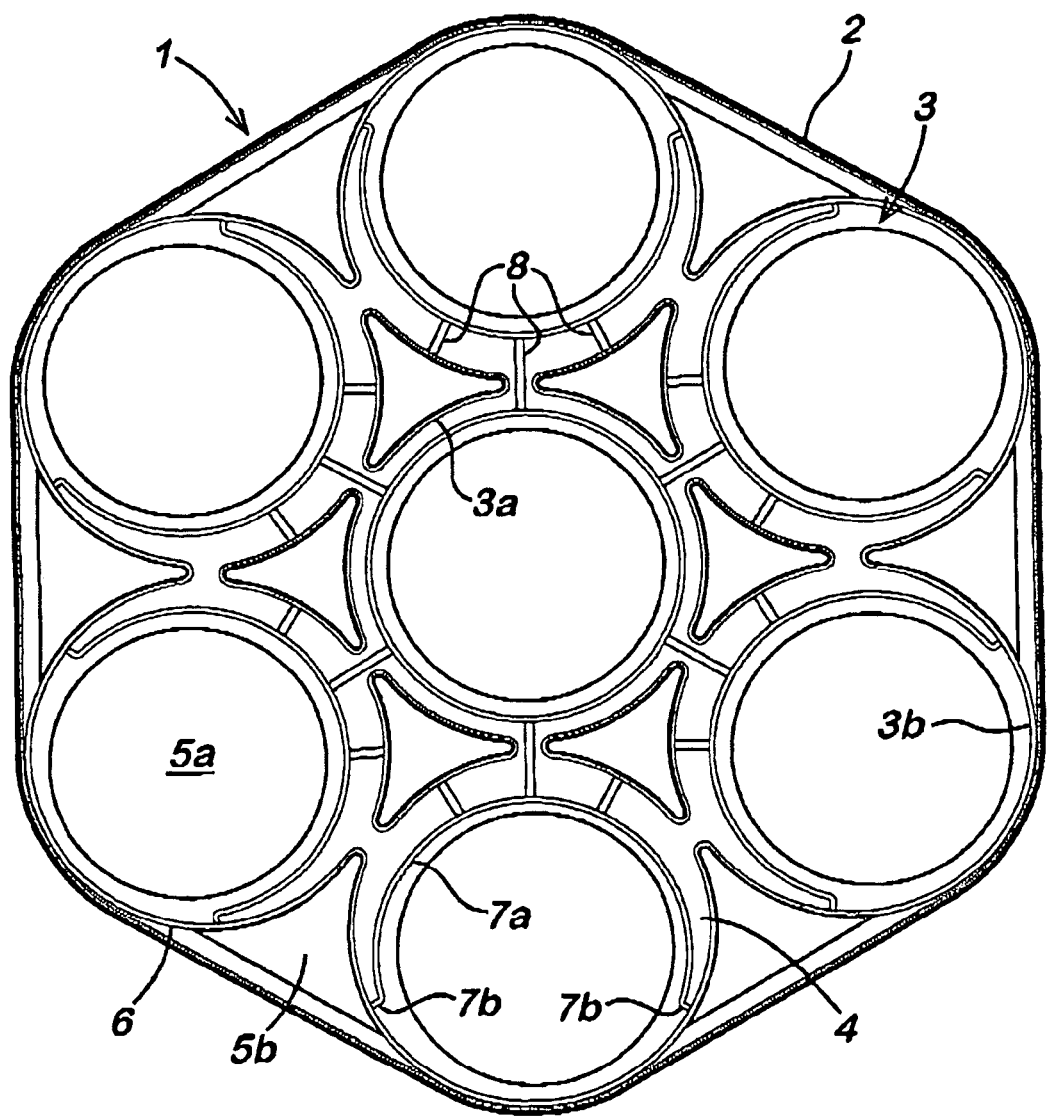
FIG. 3 is a plan view of the obverse face of a column stabiliser in accordance with a second embodiment of the invention.

In the second embodiment shown in FIG. 3, the secondary locating means 7 of the outer cells 3b are formed instead by a portion of primary locating means 6 extending over less than 180° and an additional arcuate wall segment 7a extending over greater than 180° and having a leg 7b at each end adjoining the primary locating means 6 as shown. This alternative configuration is employed for manufacturing purposes and it will be appreciated that the primary and secondary locating means 6, 7 can be configured in a variety of different ways.

In both embodiments, radial support ribs 8 join the second locating means 7 of each outer cell 3b to the second locating means 7 of the central cell 3a, and to the primary locating wall segments 6b and 6c.

Figure 2:
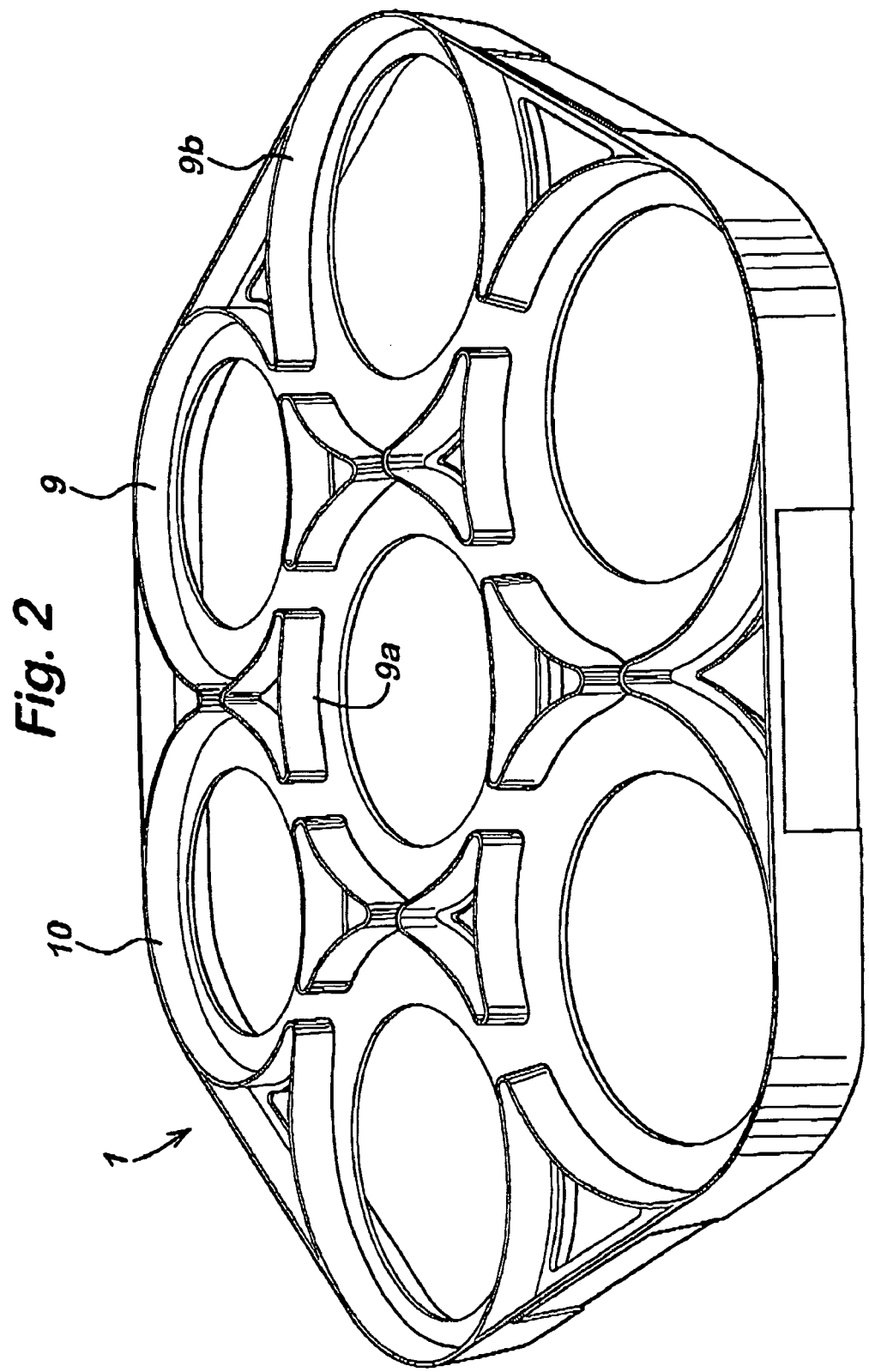
FIG. 2 is a perspective view of the reverse face of the column stabiliser of FIG. 1.
Figure 4:
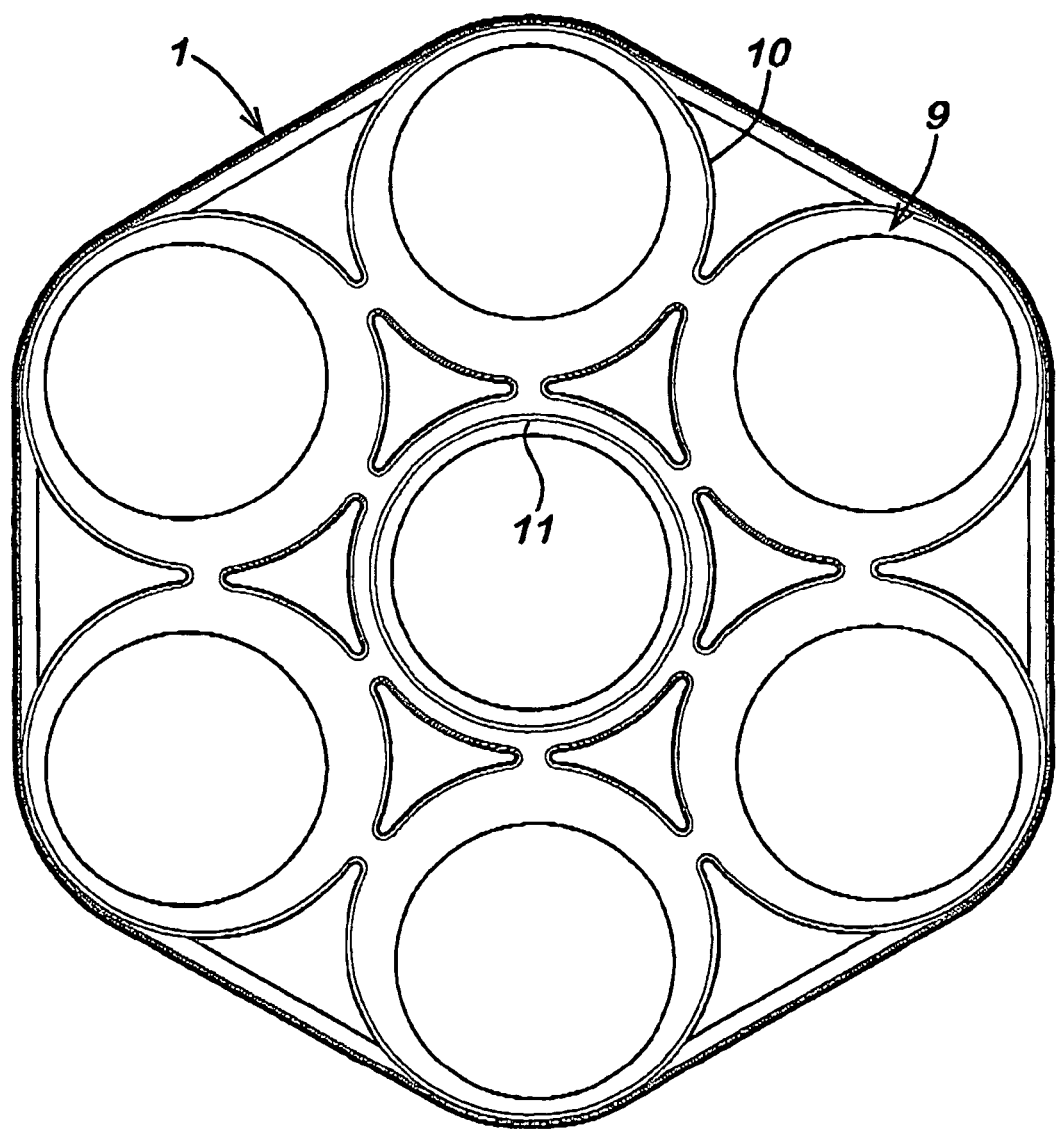
FIG. 4 is a plan view of the reverse face of the column stabiliser of FIG. 3.

The reverse face of the column stabilising grid 1 is generally similar for both embodiments, as shown in FIGS. 2 and 4, having locating cells 9 defined by a primary locating means 10 depending from the floor 4 in alignment with the primary locating means 6 on the upper surface of the grid 1. The primary locating means 10 are substantially circular, discontinuous walls. At least one locating cell 9 preferably also includes a secondary locating means 11. In the embodiment of FIG. 4 this is a continuous circular wall concentric with the primary locating means 10 defining the central cell 9a. However, in addition, or in the alternative, a secondary locating wall 11 could be provided in one or more of the outer cells 9b. In that case, the secondary locating means would be eccentric, in alignment with the respective secondary locating means on the upper side of the grid 1.

As shown in FIG. 5, the primary locating means 6 on the upper surface of the grid 1 are dimensioned to accommodate a desired first object 12, such as a 5 liter container of paint, with a relatively close fit but with some play allowed to facilitate placement of the container 12 within the cell 3. When the container 12 has been located within the cell 3, it rests on the secondary locating wall 7 and the radial support ribs 8. The primary locating means 6 resists any significant lateral movement of the bottom of the container 12.

The secondary locating means 7 is dimensioned to accommodate an alternative second, smaller object 13 such as a 2.5 liter paint container, again with a relatively close fit but with some play allowed to facilitate placement of the container 13. When the container 13 has been located within the secondary locating means 7, it rests on the floor 4 of the grid 1 and the secondary locating means 7 resists any significant lateral movement of the bottom of the container 12.

The locating cells 3 may be arranged such that the distance between the first larger containers 12 when positioned in the positive lateral locating means is either only a few millimeters or many centimeters. Preferably the cans are separated by only a few millimeters as this means that a minimum amount of floor space is occupied. The smaller containers 13 will necessarily be separated by a greater distance because of their smaller diameter.

In use, a first grid 1 is placed on a suitable stable supporting surface such as the floor or a shelf. A plurality of containers are placed within the locating cells 3 on the upper side of the grid 1. A second grid 1 is then placed on top of the containers, with each container positioned within a respective locating cell 9 on the lower side of the grid 1. A second layer of containers can then be placed on top of the second grid 1 in the locating cells 3 and so on, to build up a stable compound column.

The first layer of containers is preferably placed on a grid 1 rather than on the floor, as this positively locates the base of the column and improves stability. However, this first grid 1 could be omitted if desired.

The column may be built up of one size of container only, with each locating cell 3 receiving a container. If the larger size of container is used, each is located within a primary locating means 6. If the smaller size of container is used, each is located within a secondary locating means 7. If desired, each layer may have fewer than seven containers. If so, preferably alternate outer cells 3b are filled to provide the column with stability.

Alternatively, a mixed column of larger and smaller containers may be constructed. Clearly, the larger containers are likely to be taller, in which case the second and subsequent grids will contact only the tops of the taller containers. Therefore, for stability it is preferable if the larger and smaller containers are arranged alternately in the outer cells 3b.

In another alternative, a column may be built up of alternate layers of larger and smaller containers.

For each container within the compound column, any significant lateral movement of the bottom of the container is resisted by the first or second locating means 6,7 as appropriate to the size of the container. In addition, any significant lateral movement of the top of the container is resisted by the primary locating means 10 acting as stop means. When the smaller size of container only is being used, those cells 9 on the underside of the grid 1 which have only a primary locating means 10 allow more lateral movement of the containers but the secondary locating means 11 on the underside keeps the grid 1 in alignment with the others in the column. The eccentric location of the secondary locating means 7 on the upper side of the grid 1 causes the smaller containers to be positioned adjacent to the peripheral wall 2, where it merges with the primary and secondary locating means 6 and 7 on the upper side, and where the primary locating means 10 merges with the perimeter wall 2 on the under side. Thus, these wall portions act as stop members against lateral movement of containers radially outward of the column.

The column stabiliser may be made of any material of sufficient strength to support the weight of a compound column of containers. Examples of suitable materials include metal, wood and plastic. Plastic materials are preferred due to their light weight and ease of forming into complex shapes. Even more preferred are plastics selected from polyethylene, polypropylene, acrylonitrile-butadiene-styrene copolymers and polystyrene. Most preferred is high impact resistant polystyrene.

Although the present invention has been described in detail, it should be understood that various changes, substitutions and alterations can be made without departing from the scope of the invention as defined by the appended claims.

The invention claimed is:

1. A column stabilising grid for stabilising a plurality of stacks of objects, the grid having obverse and reverse faces, the obverse face having a plurality of first locating means each dimensioned to locate in use the base of the first object and to resist lateral movement thereof, and a plurality of second locating means each dimensioned to locate in use the base of a second, smaller alternative object and to resist lateral movement thereof, wherein each second locating means is encompassed by a first locating means, and the reverse face having a plurality of stop means positioned to abut in use the top of an object to resist lateral movement thereof, and wherein at least some of the second locating means are located eccentrically within the respective first locating means.

2. A column stabilising grid as claimed in claim 1, wherein at least some of the second locating means are located eccentrically towards the periphery of the grid.

3. A column stabilising grid as claimed in claim 1, wherein the first and second locating means comprise walls extending from the obverse face.

4. A column stabilising grid as claimed in claim 3, wherein each first locating means comprises a substantially circular wall.

5. A column stabilising grid as claimed in claim 3, wherein each first locating means comprises a series of discontinuous wall segments.

6. A column stabilising grid as claimed in claim 3, wherein each second locating means comprises a substantially circular wall.

7. A column stabilising grid as claimed in claim 3, wherein at least some of the second locating means comprise a series of discontinuous wall segments.

8. A column stabilising grid as claimed in claim 1, wherein the first locating means are contiguous.

9. A column stabilising grid as claimed in claim 1, further comprising a perimeter wall bounding the first locating means.

10. A column stabilising grid as claimed in claim 1, comprising seven first locating means arranged in hexagonal form with one central locating means and six surrounding locating means.

11. A column stabilising grid as claimed in claim 1, further comprising one or more support elements extending between a second locating means and the first locating means which encompasses it and/or another of the second locating means.

12. A column stabilising grid as claimed in claim 11, wherein in use a first object located in a first locating means rests on the second locating means and the support elements.

13. A column stabilising grid as claimed in claim 1, wherein in use a second object located in a second locating means rests on the obverse face of the grid.

14. A column stabilising grid as claimed in claim 1, wherein the stop means are aligned with the first locating means on the obverse face.

15. A column stabilising grid as claimed in claim 1, further comprising at least one stop means on the reverse face which is aligned with at least one second locating means on the obverse face.

16. A column stabilising grid as claimed in claim 1, wherein the stop means comprise walls depending from the reverse face.

17. A column comprising a plurality of stacks of objects, wherein a column stabilising grid as claimed in claim 1 is located between adjacent layers of objects in the stacks.

18. A column stabilising grid as claimed in claim 4, wherein each first locating means comprises a series of discontinuous wall segments.

19. A column stabilising grid as claimed in claim 5, wherein each second locating means comprises a substantially circular wall.

20. A column stabilising grid as claimed in claim 6, wherein at least some of the second locating means comprise a series of discontinuous wall segments.

21. A column stabilising grid as claimed in claim 1, wherein the objects are cans.

22. A column stabilising grid as claimed in claim 21, wherein the objects are circular cans.

23. A column stabilising grid as claimed in claim 21, wherein the objects are paint cans.

24. A column stabilising grid as claimed in claim 2, wherein the first and second locating means comprise walls extending from the obverse face.

25. A column stabilising grid as claimed in claim 2, wherein the first locating means are contiguous.

26. A column stabilising grid as claimed in any of claim 2, wherein the plurality of second locating means are selected from second locating means with circular wall or second locating means with a series of discontinuous wall segments.

27. A column stabilising grid as claimed in claim 26, further comprising a perimeter wall bounding the first locating means.

28. A column stabilising grid as claimed in claim 26, comprising seven first locating means arranged in hexagonal form with one central locating means and six surrounding locating means.

29. A column stabilising grid as claimed in claim 28, further comprising one or more support elements extending between a second locating means and the first locating means which encompasses it and/or another of the second locating means.

30. A column stabilising grid as claimed in claim 29, wherein in use a second object located in a second locating means rests on the obverse face of the grid.

31. A column stabilising grid as claimed in claim 30, wherein the stop means are aligned with the first locating means on the obverse face.

32. A column stabilising grid as claimed in claim 31, further comprising at least one stop means on the reverse face which is aligned with at least one second locating means on the obverse face.

33. A column stabilising grid as claimed in claim 32, wherein the stop means comprise walls depending from the reverse face.

34. A column comprising a plurality of stacks of objects, wherein a column stabilising grid as claimed in claim 33 is located between adjacent layers of objects in the stacks.

* * * * *